United States Patent
Zhakov et al.

(10) Patent No.: US 7,133,518 B2
(45) Date of Patent: Nov. 7, 2006

(54) METHODS AND APPARATUS FOR ACCOMPLISHING CALL-STATE SYNCHRONIZATION AND EVENT NOTIFICATION BETWEEN MULTIPLE PRIVATE BRANCH EXCHANGES INVOLVED IN A MULTIPARTY CALL

(75) Inventors: Vyacheslav Zhakov, El Sobrante, CA (US); Vyacheslav Sayko, San Bruno, CA (US); Leonid Nikeyenkov, San Rafael, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 229 days.

(21) Appl. No.: 10/898,071

(22) Filed: Jul. 23, 2004

(65) Prior Publication Data
US 2006/0018453 A1  Jan. 26, 2006

Related U.S. Application Data

(60) Provisional application No. 60/575,207, filed on May 27, 2004.

(51) Int. Cl.
*H02M 7/00* (2006.01)

(52) U.S. Cl. ...................................................... 379/219

(58) Field of Classification Search ................ 370/352, 370/389, 392; 379/90.01, 93.07, 114
See application file for complete search history.

(56) References Cited

U.S. PATENT DOCUMENTS

| | | | |
|---|---|---|---|
| 5,867,494 A | * | 2/1999 | Krishnaswamy et al. ... 370/352 |
| 6,335,927 B1 | * | 1/2002 | Elliott et al. ................ 370/352 |
| 6,363,424 B1 | | 3/2002 | Douglas et al. |
| 6,731,625 B1 | * | 5/2004 | Eastep et al. ............... 370/352 |

* cited by examiner

*Primary Examiner*—Creighton Smith
(74) *Attorney, Agent, or Firm*—Donald R. Boys; Central Coast Patent Agency, Inc.

(57) ABSTRACT

A system for synchronizing party information and call-state information between two or more telephone switches involved in establishing a multiparty communication session has at least one server application for serving information and receiving information and a translation service for translating received information between formats of telephony and those of digital messaging. The system uses a digital network to propagate the information between switches in a dynamic message format.

25 Claims, 7 Drawing Sheets

METHODS AND APPARATUS FOR ACCOMPLISHING CALL-STATE SYNCHRONIZATION AND EVENT NOTIFICATION BETWEEN MULTIPLE PRIVATE BRANCH EXCHANGES INVOLVED IN A MULTIPARTY CALL

The present application claims priority to provisional patent application Ser. No. 60/575,207 entitled "Multi PBX Telephony Event Notification for SIP Framework," filed on May 27, 2004, which is incorporated in its entirety by reference.

FIELD OF THE INVENTION

The present invention is in the field of telephony communications, including call processing and switching equipment, and pertains particularly to methods and apparatus for synchronizing call states between multiple call-handling points in a communications network and to providing event notification to session participants.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here. One document which provides considerable information on intelligent networks is "ITU-T Recommendation Q.1219, Intelligent Network User's Guide for Capability Set 1" dated April, 1994. This document is incorporated herein by reference.

Telephony applications have enabled communications centers to service clients in ways that are relatively efficient and that provide considerable sharing of information between call points and end users. Today, telephony applications are intelligent systems capable of being installed and used within the local network as well as within the larger Internet or other suitable networks.

A large technical support operation serves as a good example in this specification of the kind of application of telephony equipment and functions to which the present invention pertains and applies, and a technical support organization will be used from time to time in the current specification for exemplary purposes. Such a technical support system, as well as other such systems, typically has a countrywide or even worldwide matrix of call centers for serving customer's needs. Such call center operations are more and more a common practice to provide redundancy and decentralization.

In a conventional call center, a relatively large number of agents handle telephone communication with callers. Each agent is typically assigned to a telephone connected to a central switch, which is in turn connected to a public-switched telephone network (PSTN), well known in the art. The central switch may be one of several types, such as a Private Branch Exchange (PBX) for example. An automated call distributor (ACD) is another common type of call switch. Often a service control point (SCP) switch, which may be a PBX, is typically available within a network segment for accepting first-party calls local to the switch and routing those calls to other destination points, such as regional call centers.

Intelligent call routing and processing may be on several levels. Pre-routing may be done at SCPs and further routing may be, and almost always is, accomplished from individual call centers. As described above a call center typically involves a central switch, which may be, for example, an Automatic Call Distributor (ACD), or a Private Branch Exchange (PBX). The central switch is connected to the PSTN, as is well known in the art. Agents, trained to handle customer service, man telephones connected to the central switch. The local equipment is often referred to in the art as Customer Premises Equipment (CPE).

If the call center consists of just a central switch and connected telephone stations, the routing that can be done is very limited. Switches, such as ACD and PBX and the like, although increasingly computerized, are limited in the range of computer processes that may be performed. For this reason additional computer capability in the art has been added for such central switches by connecting computer servers adapted to run control routines and to access databases. The processes of incorporating computer enhancement to telephone switches is known in the art as Computer Telephony Integration (CTI), and the hardware and software used is referred to as CTI equipment.

In a CTI-enhanced system telephone stations connected to the central switch may be equipped also with computer terminals, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center.

When a call arrives at a call center, whether or not the call has been pre-processed at a SCP, typically the telephone carrier (network provider) makes the telephone number of the calling line available to the receiving switch at the call center in one of several known formats.

In state-of-art systems known to the inventor, complex call routing and processing is accomplished using extra intelligence beyond that of a normal switch. CTI processors may be made available at network level and at end service points to help route calls more efficiently and to provide robust information about the call and call parties. In many cases, both in service and business communication call states change or are modified when being established in a network. For example, the number of parties to a call can change dynamically or from different points of control.

It is possible that when calls are established between different PBXs, for example, information about the call including current call-state information may be lost in the process. A typical example of a call established by more than one switch where information may not be available to all parties is exemplified by the following exemplary description:

A first caller (C1) initiates and establishes a connection through a first PBX (PBX1) to a second caller (C2) monitored by the same PBX. C2 may after being established in session with C1 decide to bring a third caller (C3) into the conversation through a second PBX (PBX2) so that all three callers may conference. However, C3 may only receive caller identification information about C2 because C2 is the sole party that initiated the addition of C3 by placing an additional call to C3 and then bridging the party connection at PBX2.

A problem with current art call handling among multiple switches is that for each state change, defined as a possible call state related to one or more actual or potential parties of a call, the latest PBX has no information that C1, for example, is already in a session with C2. Likewise, C1 will receive no information about C3 except by voice after state has changed or on word of C2. The only bi-directional identification information exchange is between C1 and C2 (root). Depending on the business scenario, C1 may not wish to conference with C3 without proper identification. Likewise, C3 may be unaware of C1 and may not wish to participate if the identity of C1 were known to C2. This example reflects a simple three-party scenario and it will be appreciated by the skilled artisan that more than three parties and more than two switches may be involved in a complex multiparty session.

Therefore, what is clearly needed is a system that enables multiple PBXs involved in servicing a multiparty communication session to share information about all call-related events that may occur in an active multiparty session including the identification information of all of the parties and potential current call or connection states of the parties involved.

SUMMARY OF THE INVENTION

A system for synchronizing party information and call-state information between two or more telephone switches involved in establishing a multiparty communication session is provided, including at least one server application for serving information and receiving information; and a translation service for translating received information between formats of telephony and those of digital messaging.

In a preferred embodiment synchronization between switches occurs over a data packet network. In this embodiment, the data packet network may be the Internet network and session initiation protocol may be used to propagate the information between switches. The information synchronized includes party name and communication access number and call-state of parties. In one embodiment, the communication access number is a telephone number.

In one embodiment of the present invention the translation service translates between session initiation protocol format and computer integrated telephony format. In all aspects, call-state information may include party addition, party transfer, hold, and call waiting. In one embodiment, the translation service translates between session initiation protocol format and transaction server format. In one embodiment, the communication session is a multiparty telephone call.

In one aspect, the system includes a notification mechanism for notifying parties of identification information and call-state of other parties to the multiparty communication. In a version of this aspect notification mechanism is a session initiation protocol server. In another version of this aspect, the notification mechanism is an instant message server. In still another version of this aspect, the notification mechanism is an email server.

According to another aspect of the present invention, a method for synchronizing call-state information between two or more telephone switches involved in a multiparty communication session over a communications network is provided. The method includes steps of (a) connecting each involved switch to a digital network; (b) establishing a call connection using the two or more switches between a first party and a second party; (c) establishing minimally one additional party by second call connection to define a multiparty session; (d) from the digital network side of each switch, monitoring the party information and call-state events of each party connected to each switch involved in the communications session; (e) causing propagation over the digital network from certain ones of the switches to other switches involved in the session, party-identity and call-state information as the information becomes available to the certain ones of the switches; and (f) causing notification to be sent to certain parties connected to the switches receiving the party identification and call-state information, the notifications containing the party identifiers and current call-states of the other parties.

In one aspect, in step (a), the digital network is the Internet network. Also in one aspect, in step (a), the switches are private branch exchange switches and the communications network is a public switched telephone network. In a preferred aspect, in step (a), connecting involves physical network connection and software for communication between switches.

In one aspect, in step (b), the call connection established is a telephone call. Also in one aspect, in step (d), the party identification and call state events for a session are monitored through a computer integrated telephony link by a transaction server software. In a preferred aspect, in step (e), the method of propagation is a messaging network supported over the digital network.

In one aspect, in step (e), the messaging protocol is session initiation protocol. In another aspect, in step (e), the messaging protocol is instant message protocol. In one aspect, in step (f), the method of notification is interactive voice response notification. In another aspect, in step (f), the method of notification is computerized display text messaging.

According to yet another aspect of the present invention a server application for serving and receiving party identification and call-states of parties from a telephone switch participating in a multiparty communications session. The server application includes, in a preferred aspect, a portion for receiving real time data from a telephone switch; a portion for translating the data into a messaging format; and a portion for generating and sending a formatted message containing the data to certain other like applications associated with certain other switches.

BRIEF DESCRIPTION OF THE DRAWING FIGURES

DESCRIPTION OF THE PREFERRED EMBODIMENTS

Figure 1:
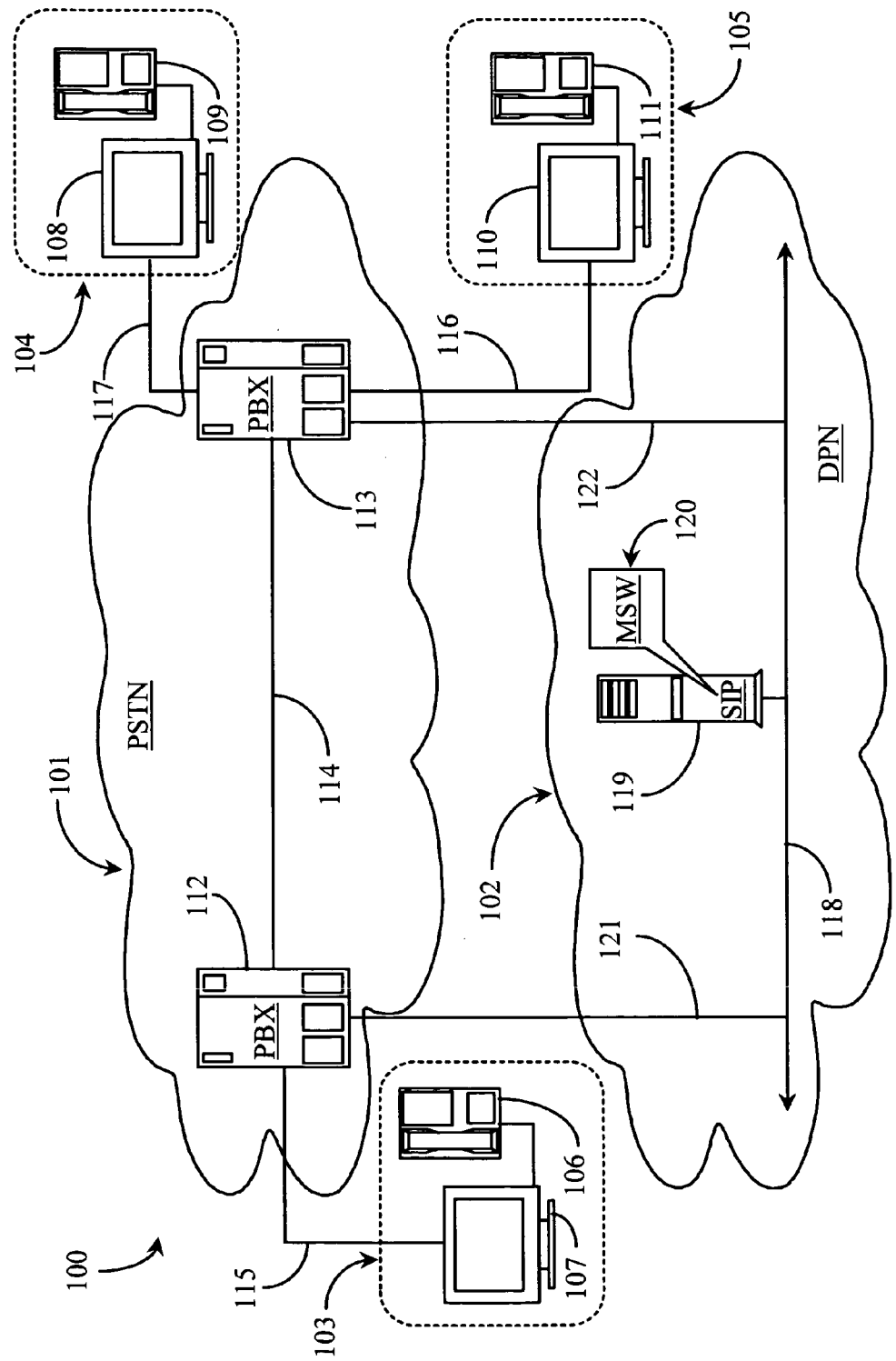
FIG. 1 is an architectural overview of a communications network wherein call-state synchronization is practiced according to an embodiment of the present invention.

FIG. 1 is an architectural overview of a communications network 100 wherein call-state synchronization is practiced according to an embodiment of the present invention. Communications network 100 includes a telephone network 101, which in this example is a public-switched-telephone-network (PSTN), and a data-packet-network (DPN) 102. Network 101 may be a private telephone network instead of a public network without departing from the spirit and scope of the present invention.

DPN 102 is the well-known Internet network in one embodiment, but may be another data network in another embodiment such as an Intranet network, or a corporate wide-area-network (WAN). One with skill in network architecture will appreciate that the physical boundaries between network lines that carry what is known as conventional connection-orientated-switched-telephony (COST) and data network telephony (DNT) over shared bandwidth are blurred with respect to physical network architecture. The inventor logically illustrates two physically separate networks for ease of explanation of the present invention only.

PSTN 101 may be assumed to contain all of the carriers, service points, lines, and gateway facilities that are known to be present in such a network. In this example, two telephony switch facilities are illustrated. These are a private branch exchange (PBX) 112, and a PBX 113. PBX 112 and 113 are well-known telephony switches adapted to enable routing and switching of calls through the geographic network from source to destination. Likewise, PBX 112 and 113 function to connect multiple calling parties together in one session such as is the case of a three-party conference call, for example.

PBX 112 in this example is connected to PBX 113 via a telephony trunk cable or backbone 114, thus both switches can communicate with each other and can cooperatively maintain call-party connections and bridge calls. In state-of-the-art communication callers may be COST-based or DPN-based when placing and receiving telephony calls facilitated at some level within PSTN 101.

PBX 112 and PBX 113 have connection via network-access cables 121 and 122 respectively to a DPN backbone 118 illustrated within DPN network 102. There may be one or more network gateways or bridges (not illustrated) configured between PBXs 112 and 113 and network 102 to aid in data and control signal translation for calls placed between the networks, or for those routed between the two networks. One example is the well-known bell core standard SS-7.

A calling party's equipment 103 is illustrated in this example having connection to network 101 at the initial point of PBX 112. In this example this point will be referred to as the "calling party". Calling party 103 is logically illustrated herein as a communications station, which may be represented by a telephone (106) and a data terminal (107). Party 103 is logically illustrated with a communication network connection to PBX 112 within PSTN 101.

In this example, telephone 106 of party 103 has connection to data terminal 107 for exemplary reasons only. Station 103 has access to PBX 112 by way of a network-communications cable 115, which may typically be a telephone cable or some other network access line. A variety of connection cable types are known in the art and available to be used in the invention. Among these are plain old telephone service (POTS) wiring, and higher-end digital-carrier-lines (DCLs). Moreover, party 103 may utilize a wireless network and service to gain access to PBX 112. Additionally, it may be assumed that station 103 is Internet-capable in this example. Such capability may be represented by a variety of known connection means such as dial-up through an Internet service provider (ISP), cable modem connection, integrate services over digital network (ISDN), digital subscriber line (DSL), and others.

PBX 112 may represent the local switch closest to, or best available to party 103 in the network at the time of a call initiation made by party 103. For the purpose of the present invention, it may be assumed that party 103 is in the process of initiating a telephony session or call through the service of PBX 112. A second calling party 104 is illustrated in this example also by a station and has network access to switch 113 via network access line 117. Like station 103, station 104 has a data terminal 108 and a telephone 109. Data terminals 107 and 108 may be personal computers (PCs). The only logical difference between parties 103 and 104 is that they have connection to, and are serviced by different telephone switches, these being switches 112 and 113 respectively.

A PC 110 and a telephone 111 represent a third party 105 in this example. Party 105 is not, in this example a calling party, but is a party that is added to a two-party call between party 103 and party 104 to make a three-party call in this example. Party 105 has connection to switch 113 via a network communications line 116. In this example a single PBX (113) maintains call representation state on parties 104 and 105. PBX 112 maintains call representation state on only party 103. Assuming party 103 initiates a two-party call to party 104 through switches 112 and 113, the states of both parties are maintained both at switch 112 and at switch 113 because of the fact that only one call is active. In other words, a simple two-party connection is, without benefit of the present invention, already state-synchronized in that both switches "know" of all of the call events occurring during the two-party session for both parties.

Assume now that a two-party call is established between party 103 and 104 through switch 112 and 113. Party 104 then adds party 105 to the session by placing a second call to party 105. Without benefit of the present invention, all call-state events of party 105 are known to switch 113, but not known to switch 112 because the control of adding the third party belongs to switch 113. For example, original calling party 103 is unaware of the identification (ANI), (DNIS) or other information relative to party 105. Similarly, party 103 is not aware of any call-state information occurring during the session to party 105. Likewise, party 105 is in aware of the parameters and state of original calling party 103.

As previously described, switches 112 and 113 have connection via network lines 121 and 122 respectively to a DPN backbone illustrated herein as backbone 118. Backbone 118 is intended to represent all of the lines, equipment, and access points that make up the DPN as a whole, which in one embodiment is the Internet.

A session initiation protocol (SIP) server 119 is illustrated in this example, within DPN 102 and in a state of connection to backbone 118. SIP server 119 is adapted to broker SIP messages sent between network-connected clients. In this embodiment, PBX 112 and PBX 113 are network-connected clients through SIP server 119. Call state-events of party 105 connected to PBX 113 and calling party 103 connected to PBX 112 in the three-party call example described above may be synchronized between participating switches over the data network in the form of SIP messages. SIP is an XML-based protocol that uses a simple object application protocol (SOAP) wrapper for message transport.

Server 119 has a management software (MSW) 120 provided thereto and adapted to manage PBX call-state synchronization and, in this example, to translate SIP protocol to a form useable by PBX clients. Sub-components comprising PBX adaptors of MSW 120 may, in one embodiment, be provided to both PBXs 112 and 113 within network 101. In another embodiment, PBX adapters or connector components may be distributed to applicable gateways that exist between the PBXs and the data network backbone.

In simple state synchronization, a PBX servicing a party may monitor state events of that party and synchronizes those events with those of another party of the same session that is serviced by a different switch. SIP protocol is used in one embodiment to propagate messages to respective PBX switches. In this case each PBX has current call-state representation of its own monitored parties and those parties belonging to other switches. Therefore, the call-state representation of all parties to a session may be synchronized and consistent.

In one embodiment voice messaging may be used to alert parties engaging in a session that some call state has occurred with reference to another party of the session. For example, a message such as "party 2 has placed party 3 on hold". In this case, the notified party also may be given voice-synthesized identity information of the parties involved in the "hold" call-state event. Identification of the parties pursuant to the event may also be caused to display on a suitable display window of a telephone or other computerized device.

In another embodiment, SIP messages may be sent to data terminals connected to the network via DPN wherein the state-event notifications including appropriate identity information is propagated using instant messaging (IM) protocol. A real-time session event model may also be provided for PCs and the like wherein event notifications appear as they are received.

Call-state notification for all parties enables all parties to a session to see what is occurring with respect to all of the other parties of the session. This is particularly useful in high-level negotiations, legal briefings, and other critical business conducted over the telephone using multiparty connection methods. In a more complex scenario, CTI capability can be leveraged to practice the present invention as is described in more detail below.

Figure 2:
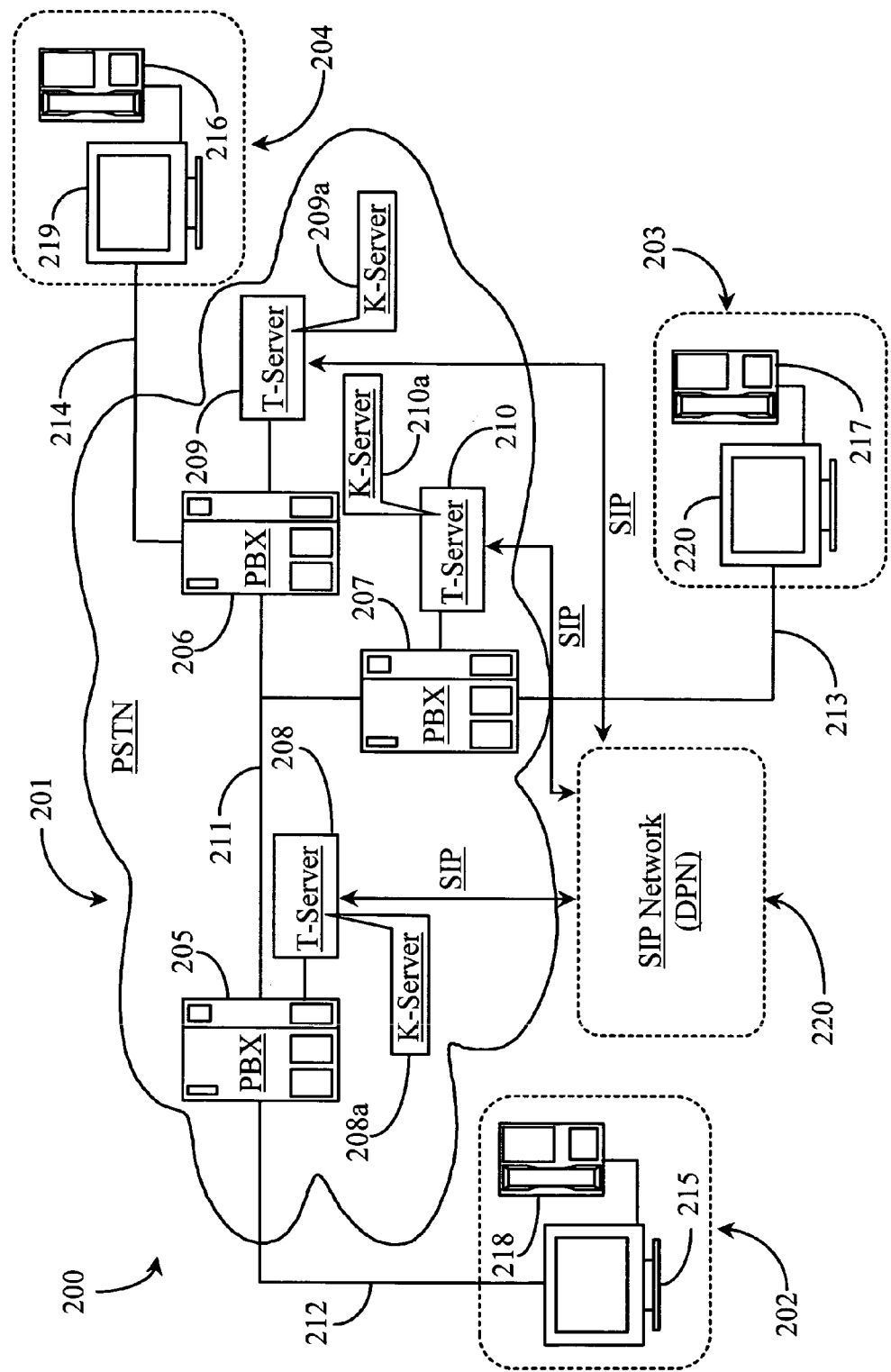
FIG. 2 is an architectural overview of a PSTN network practicing CTI-enhanced call-state synchronization according to an embodiment of the present invention.

FIG. 2 is an architectural overview diagram 200 of a PSTN network 201 wherein CTI-enhanced call-state synchronization is practiced according to an embodiment of the present invention. Network 201 is similar in description to the PSTN network 101 described with reference to FIG. 1 above. However, in this example there are three PBX telephony switches illustrated instead of two. These are a PBX 205, a PBX 206, and a PBX 207. One with skill in the art will recognize that there may be more than three PBX switches involved in a multiparty call scenario.

PBX switches 205–207 have connection to each other via telephony trunking 211. Each PBX switch illustrated within network 201 is CTI-enhanced by a CTI-processor running an instance of transaction server (T-Server) known to the inventor, which is proprietary CTI-enhancement software. T-Server instances are installed on processors 208, 209, and 210, all connected to respective switches by a CTI link. In typical operations known to the inventor, T-Server software provides routing and other intelligence to PBXs and other telephony switches where applicable. T-Server capability may be hosted and maintained by an enterprise operating one or more communication centers adapted to service customers of the enterprise. Likewise, associates working in one or more centers may, from time to time, collaborate by telephone and/or data terminal over the operating network.

T-Server instances communicate with each other via a network separate to the telephone lines, and are used mainly in intelligent routing, which may rely on robust knowledge of caller parameters such as caller identity and purpose of the call. In this example, T-Servers 208, 209, and 210 are connected to DPN 220, which supports SIP networking.

Each instance of T-Server illustrated in this example is enhanced for practice of the present invention by provision of an instance of SIP-capable software termed a K-Server by the inventor. In this example, K-Server 208a is integrated with T-Server 208; K-Server 209a is integrated with T-Server 209; and K-Server 210a is integrated with T-Server 210. K-Servers 208a, 209a, and 210a communicate with each other and are adapted as SIP extensions or proxies enabling SIP message generation and receipt to be extended to the level of the switches within PSTN network 201 albeit a DPN is used for actual transport of the SIP messaging between switches.

In this example there are three illustrated parties as was described above with reference to FIG. 1. These are a first calling party 202 having a data terminal 215 and a telephone 218; a second calling party 204 having a data terminal 219 and a telephone 216; and a third party 203 having a data terminal 220 and a telephone 217. In this case, the third party 203 is not considered a calling party for this example as the party is "brought in" to a session with the first two parties and does not physically place a call. However, in another example, any of the illustrated parties may be considered a calling party if they physically initiate addition of another party to a multiparty session.

A difference between this example and the previous example of FIG. 1 is that a single PBX monitors each illustrated party. Party 202 has connection to switch 205 via network line 212; Party 204 has connection to switch 206 via network line 214; and Party 203 has connection to switch 207 via network line 213. Therefore each switch monitors just one party.

Assume now that party 202 has established a two-party call to party 203 through switch 205 and switch 207. At this point no synchronization of events is required because only two parties are connected to a session. Assume now that party 203 transfers party 202 to another party, particularly to party 204. For this to occur party 202 may be placed on hold and party 203 may place a call to party 204 through switch 207 and switch 206.

After a ringing event and pickup, the call is established between party 203 and 204. However, switch 206 has no information about party 202 events or identification. Therefore, party 204 only sees party 203. K-Server 210a on T-Server 210 of switch 207 may send an SIP message containing state information and identification information about party 202 to K-server 209a on T-server 209 of switch 206 at the time of call establishment between party 203 and 204. Because of the nature of the two-party call between switch 207 and switch 206 before transfer, no synchronization between party events or identification of parties 203 or 204 is required. Party 204, through benefit of the present invention can see that party 202 is part of the session and is on hold without yet speaking to party 203.

In one embodiment, party 203 may be an automated dialing service that interacts with part 204 by synthesized voice interaction. A calling party does not have to be a human party. In this particular example the parties are human, but this is not a limitation ion the invention. Party 203 may transfer party 202 to party 204 by first establishing the call legs between the parties and then disconnecting from the session. In this case, party 202 still cannot see events or identification of party 204 even after the transfer is complete without the aid of the present invention. K-server 209a on T-Server 209 of switch 206 must generate and send identification and state information to K-Server 208a on T-Server 208 of switch 205 in order for switch 205 to see party 204 after the call is transferred. This may be accomplished via K-Server 210a, or directly, bypassing switch configuration 207 because the first message received at K-Server 209a may contain a network address of K-Server 208a.

Party 203 disconnects from the call immediately after establishing the call between party 202 and party 204. However, the new two-party transfer connection may be established among three switches if one switch (207) is not also dropped from the call path as an unnecessary proxy. In such as case, K-Server messaging using SIP enables event state synchronization and identity synchronization of both parties 202, and 204. Likewise, both parties may verify that party 203 has actually disconnected from the session and is not instead passively monitoring the new two-party session.

An SIP service within the domain of DPN 220 provides SIP over TCP/IP transport capability between instances of K-Server. In one embodiment, T-Server instances provide CTI communication from switch to K-Server and from K-Server to switch using a translation service. Call-state events may be extended according to T-Server capabilities in provision of additional services to respective switches. Therefore K-Served state-event notification may include events that normally would not be possible without T-Server enhancement.

Figure 3:
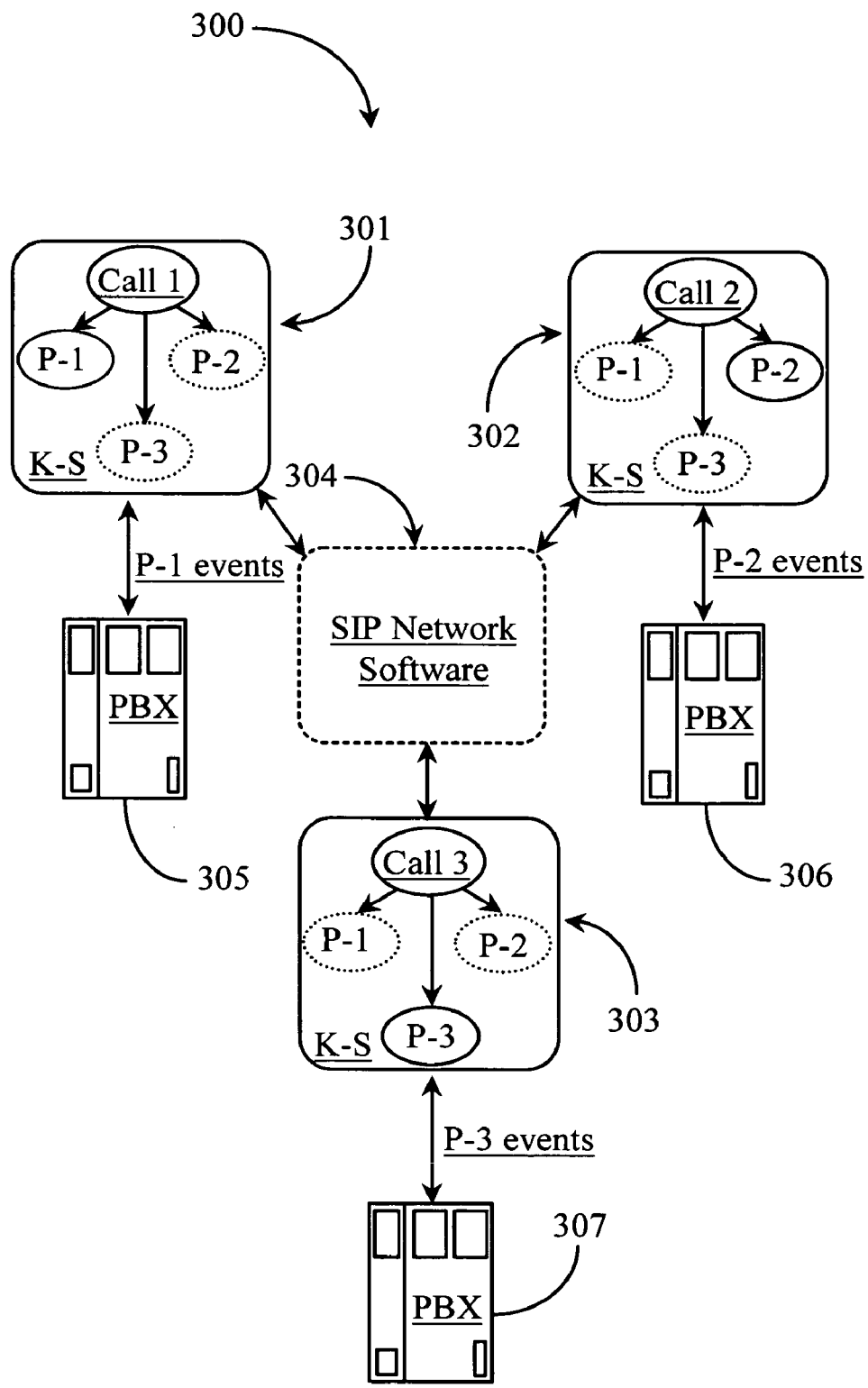
FIG. 3 is a block diagram illustrating call-party-event synchronization using session initiation protocol (SIP) according to an embodiment of the present invention.

FIG. 3 is a block diagram 300 illustrating call-party-event synchronization using session initiation protocol (SIP) according to an embodiment of the present invention. Diagram 300 illustrates separate instances of K-Server and respective telephone switches involved in state synchronization. For example, an instance of K-Server 301 is associated with a PBX 305; an instance of K-Server 302 is associated with a PBX 306; and an instance of K-Server 303 is associated with a PBX 307. All may be assumed to be involved in state management and synchronization for a multiparty session comprising a first party (P-1), a second party (P-2), and a third party (P-3) much as described with reference to the architecture of FIG. 2 above.

Each K-Server will represent the multiparty session in terms of parties and state information. If there were 4 switches, then 4 K-servers would be involved in call-state representation. K-Server 301, for example, has a representation of the multiparty session from the viewpoint of switch 305 labeled herein Call 1. The call representation shows all three parties exist in the session after synchronization, but only monitors the events of P-1. K-Server 301 references P-2 and P-3 but does not monitor them. K-Server 302 has a representation of the multiparty session from the viewpoint of switch 306 labeled herein Call 2. Like K-Server 301, K-Server 302 monitors events of P-2 and not P-1 or P-3. K-Server 303 has a representation of the session from the viewpoint of switch 307 and monitors only P-3, but not P-1 or P-2. In a preferred embodiment, all three call representations, are maintained in a state of sync as dynamic events occur with respect to parties. After K-Server synchronization of party identity and event state notification has happened, all call representations, call 1, call 2, and call 3 contain the same information.

If parties P-1 and P-2 were connected through switch 305 instead of through separate switches, then K-Server 301 would directly monitor state of both parties and switch 302 may then be rendered not necessary for support of the existing multiparty session. Minimally, state synchronization occurs where there is a multiparty session with three users wherein two of those are monitored by one switch and the remaining monitored by another switch. However, it will be appreciated that there may be many more than two switches and three parties involved in state synchronization.

Figure 4:
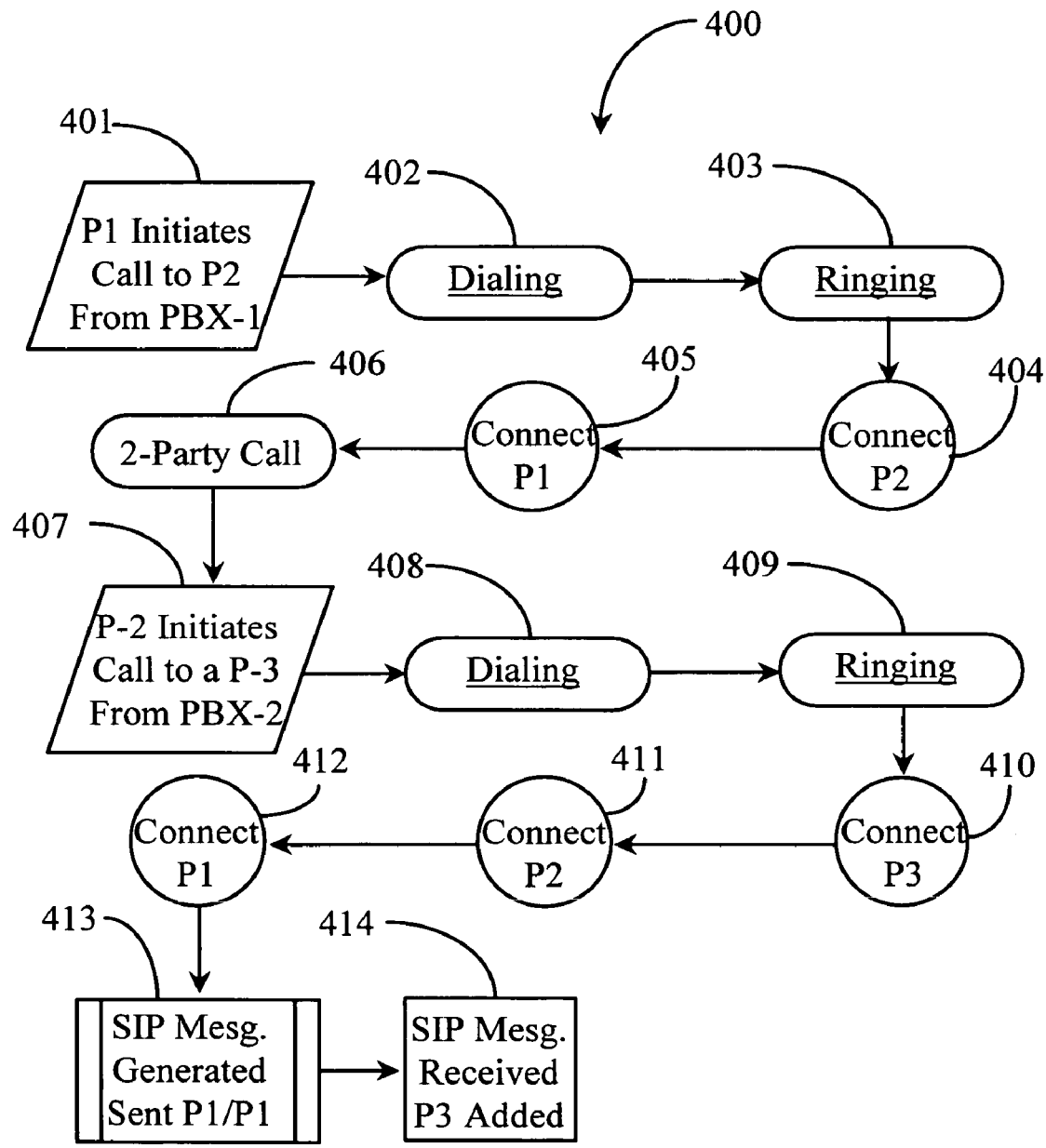
FIG. 4 is a process flow diagram illustrating steps for state synchronization according to one embodiment of the present invention.

FIG. 4 is a process flow diagram 400 illustrating steps for state synchronization according to one embodiment of the present invention. Process 400 involves 3 parties and two switches similar to the embodiment of FIG. 1 above. At step 401, party 1 (P1) initiates a call to a second party (P2) from a first PBX (PBX-1). At step 402 a dialing event occurs at P1 location. At step 403, a ringing event occurs at the switch location of P2 monitored by a second switch.

At step 404, P2 answers and is connected to the second switch. At step 405, P1 is connected through the first and second switch to P2 and in step 406 a 2-party call is established as an active session using two telephony switches. At this point no state notification or identification notifications are required because the session is a simple two party call. As well, it is possible that only one switch may be involved in a two-party call if both parties are local to the switch.

At step 407, party 2 decides to add an additional party to the session and initiates a call to a third party through the second switch. At this step or immediately prior, P1 may be placed on hold while P2 places the call. At step 408, a dialing event occurs at the location of P2. At step 409, a ringing event occurs at the switch location of P3, which is the same switch monitoring P2. At step 410, P3 answers and is connected to switch 2. At step 411, P3 is connected to P2, and at step 412 both parties are connected to P1 through switch 1. A SIP message containing the identification of P3 and a notification of a new state of "party added" is generated on behalf of a P1 representation at the second switch and is sent to the first switch over a data network supporting SIP messaging.

At step 414, switch 1 receives the message and notes the event "party added to session" and the identification of the added party. The notification may be displayed for P1 on a telephone display on a hand-held device, or by way of pop-up display on a connected data terminal if one is used.

The nature of this simple addition of a third party to forge a multiparty call is performed from the location of switch 2 in this example, and is controlled by P2. It is a separate call than the two party call established between P1 and P2 therefore, it may be necessary to send an SIP acknowledgement from the first switch to the second switch giving state of the first party (P1). However, because only two switches are involved, P3 may gain state and identity of P1 as engaged to P2 (call number 1) from switch 2 at the same time that P3 is added to the call. P1 does not have that option, as P3 is not connected directly to switch 1.

The following example illustrates possible SIP messaging format.

1. INFO
INFO sip:party1@pbx1.genesyslab.com SIP/2.0
From: <sip:party1@pbx2.genesyslab.com>
To: <sip:party1@pbx1.genesyslab.com>

Call-ID: 123456789@pbx1.genesyslab.com
CSeq: 1 INFO
Content-Length: ???
Content-Type: application/xml
Via: SIP/2.0/TCP 192.168.20.53.5085;branch= z9hG4K5abcdef
<XML/CSTA Payload: Party "Party 3" added>

2. 200 OK
SIP/2.0 200 OK
From: <sip:party1@pbx2.genesyslab.com>
To: <sip:party@pbx1.genesyslab.com>
Call-ID: 123456789@pbx1.genesyslab.com
CSeq: 1 INFO
Content-Length: ???
Content-Type: application/xml
Via: SIP/2.0/TCP 192.168.20.53: 5085;branch= z9hG4bK5abcdef <XML/CSTA Payload>

Note that SIP Messages above includes Call ID, which may be generated in the following form:

Call-ID: <Connection ID>@pbx1.genesyslab.com

Figure 5:
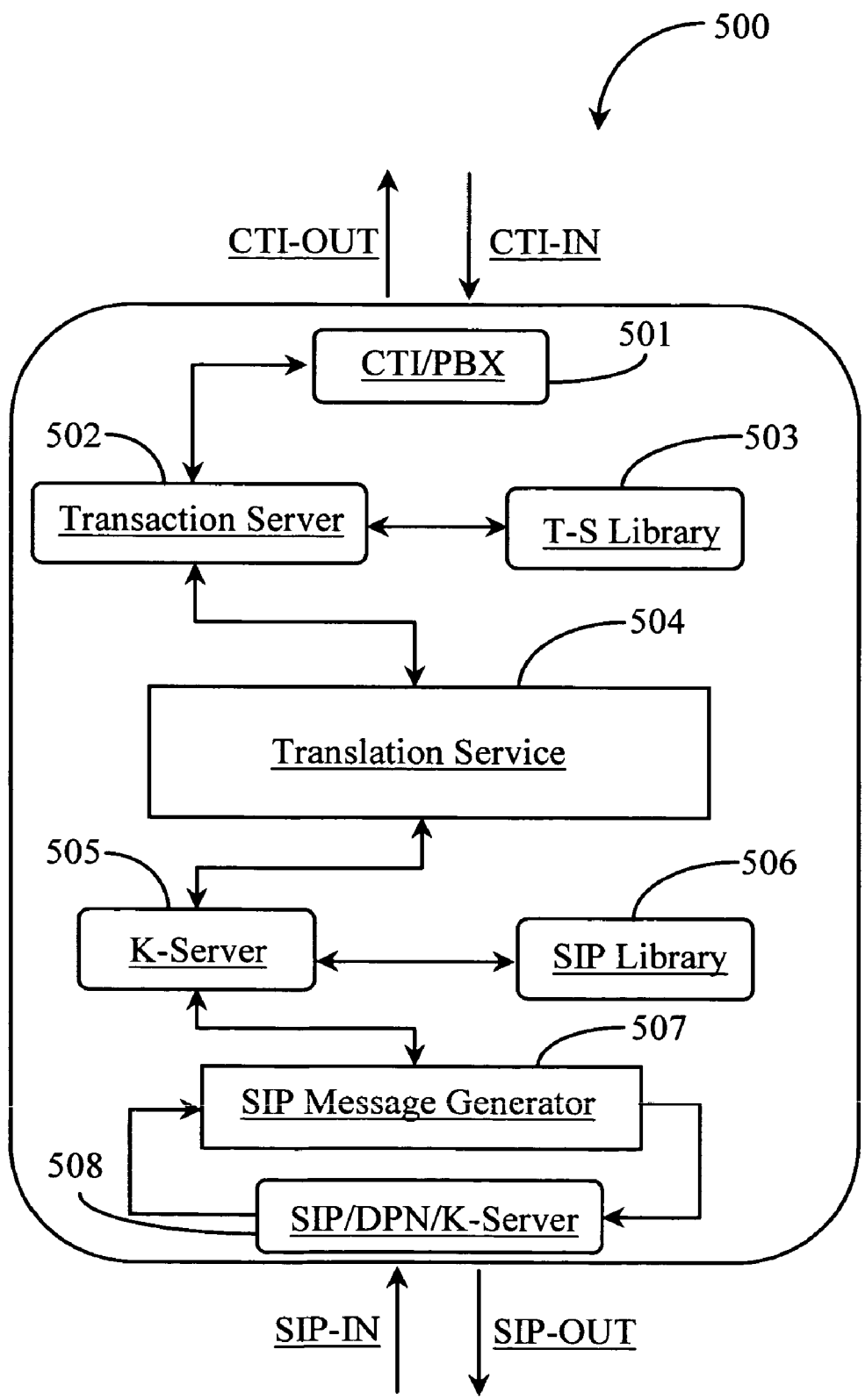
FIG. 5 is a block diagram illustrating a CTI-enhanced K-Server component according to an embodiment of the present invention.

FIG. 5 is a block diagram illustrating a CTI-enhanced K-Server component 500 according to an embodiment of the present invention. Component 500 represents, in one embodiment, the integrated components of a transaction-server instance and a k-server instance as is illustrated with reference to T-Server 208 and K-Server 208a, for example, installed at PBX 205 of FIG. 2 above.

In this embodiment, component 500 functions as an addition to a CTI processor connected to any telephone switch to enable practice of the present invention in a CTI-enhanced embodiment. Component 500 may be a hardware component running software or firmware according to the present invention and may be connected to a CTI processor, or it may be a software implement installed on and running on a CTI processor connected to the switch. In still another embodiment as a software implement, component 500 may be installed on the switch itself.

In this example, component 500 has a communication port 501 for communicating directly with a CTI-enhanced telephony switch. Port 501 may be a software or hardware port depending on implementation. Component 500 has an instance of transaction server 502 provided thereto and adapted to communicate with and control the connected switch for the purpose of provision of intelligent routing and call handling commands. Transaction server 502 includes a semantic library or T-library 503 adapted to provide the necessary semantics for translating T-server format into telephone command formats and the reverse case.

Component 500 has an instance of K-server 505 provided thereon and adapted to provide event notification and state synchronization between multiple switches involved in a multiparty call as previously described. K-server 505 includes an SIP library 506, which contains the SIP messaging protocols and semantics required for generation and translation of SIP messages. A translation service 504 is provided in between transaction server 502 and K-server 505. Translation service 504 brokers communication between K-server 505 and T-server 502. Translation service 504 leverages the appropriate semantics libraries through respective server instances.

An SIP message generator 507 is provided within component 500 and is adapted to generate SIP messages containing notification of events and sync-state events including acknowledgement messages or any error messages. An input/output (I/O) messaging port 508 is provided within component 50 and is adapted to enable network access and communication on the DPN side of component 500. Port 508 accepts SIP messages coming in from other K-server applications and is used to propagate messages to other K-servers as required for event notification and state synchronization between switches.

In use, a CTI request or command representing a state change or party addition or the like arrives at port 501. T-server 502 uses calls translation service 504 to provide the K-server version of the command or request. In this case, the K-server version is an SIP message and SIP messaging is sent out to the appropriate K-servers of other switches involved in a session. When an SIP message arrives at component 500 through port 508 (SP-IN), the K-server used translation service 504 to help create a T-S version, which may then be communicated to and understood by the connected switch.

In one embodiment of the invention some messaging or session protocol other than SIP may be used to communicate among switches. Likewise, session state and event notification messages may be routed to respective client data terminals like PCs, hand-held devices, and the like.

In this example, K-server function is an added component to an existing (CTI/T-server) set-up. However, K-server 505 may in some cases, be installed directly into telephony switches and be adapted to translate SIP into telephony commands. Component 500 can be distributed to any number of telephony switches setup in a given network without departing from the spirit and scope of the invention. This enables session event notification and state synchronization for any multiparty call involving two or more telephony switches thus enhanced.

Figure 6:
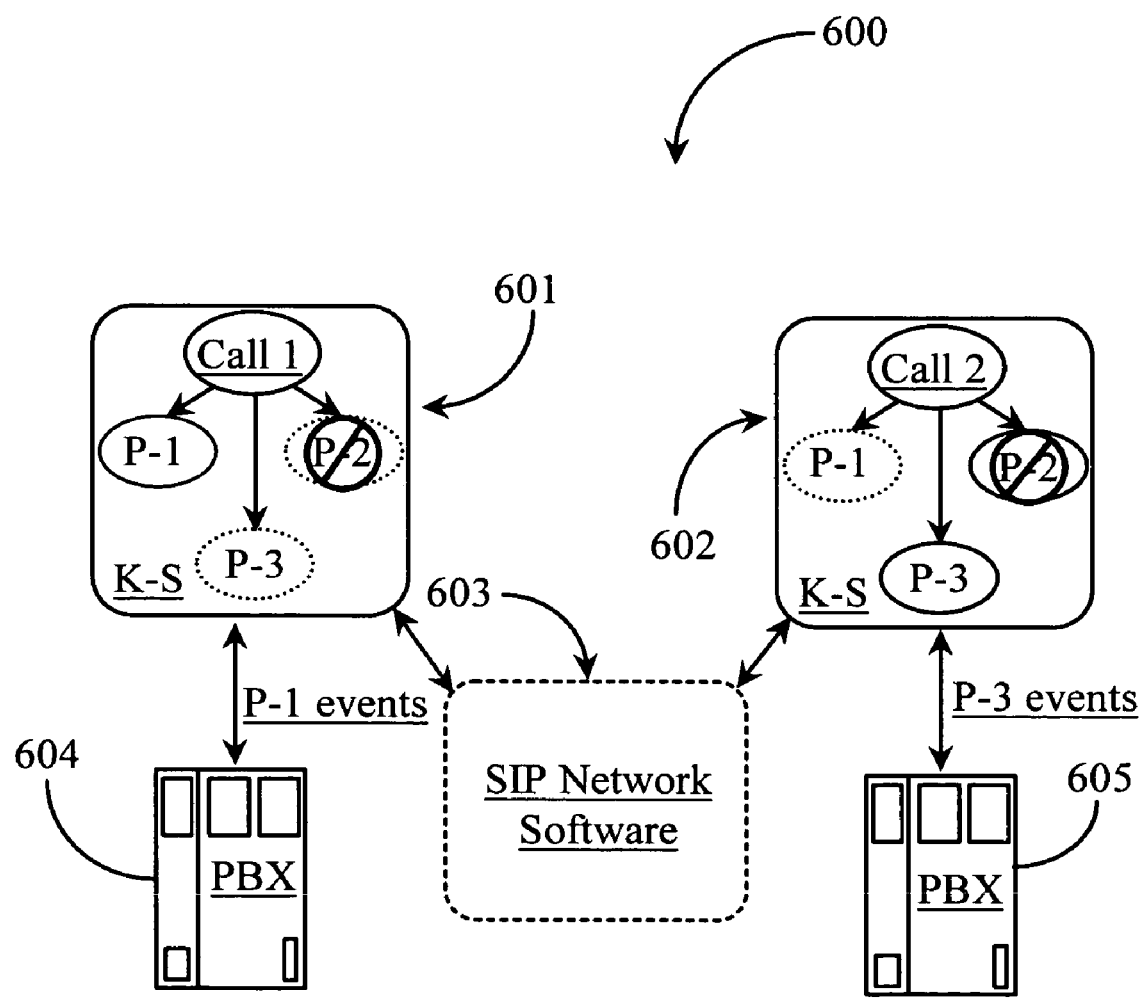
FIG. 6 is a block diagram illustrating SIP event-synchronization of a call-party transfer event according to an embodiment of the present invention.

FIG. 6 is a block diagram 600 illustrating SIP-event synchronization of a call-party transfer event according to an embodiment of the present invention. Diagram 600 illustrates two PBX switches 604 and 605 enhanced with K-servers 601 and 602 having connection to each other through SIP messaging network 603.

Switch 604 monitors events of a party P-1, who initiates a two-party call (Call 1) to a party P-2 initially monitored by switch 605. In this case, P-2 monitored by switch 605 transfers P-1 to a party P-3 subsequently monitored by the same switch or switch 605.

P-2 initiates a second call through switch 605 (Call 2) to P-3. P-1 may be placed on hold during this action, which may be classified as a call-event that may be propagated to switch 605 via SIP over IP from K-server 601 to K-server 602. In this way, P-3 may answer call 2 and immediately see the identification of P-1 and that P-1 is on hold. Likewise, P-3 has P-2 identification once call 2 is established.

After establishing call 2, K-server 602 may send an SIP message to K-server 601 containing the identification of P-3 and that P-2 and P-3 are established in a call. Switch 602 then connects P-1 and P-3 together and P-2 disconnects from the call. This event may be propagated from K-server 602 to K-server 601 in an SP message over IP notifying switch 604 that P-2 has dropped off from the connection completing the transfer. All of the SIP event notification and syncing may occur in an automated sequence wherein the exact message details can be granulated to various levels. For example, in one embodiment P-1 even though on hold waiting the transfer can see P-3 once P-2 has established the call with P-3 and is still connected. In another embodiment P-1 may just be notified of P-3 and disconnect of P-2 in a single message notification.

As is illustrated with respect to both K-servers 601 and 602, call-state is synchronized between them including validation that P-2 is no longer physically connected to the session. As P-1 and P-3 continue to initiate reportable call events, the new state information and identifications are automatically synchronized between the K-servers. For example, if P-3 adds a new party P-4 to the session, switch 604 is automatically notified. Likewise, if a new switch comes online as a result of new parties added, that switch will receive state and identity information from the other switches involved.

The following is an example of an SIP message notifying of a party transfer state.

1. INFO
INFO sip:party1@pbx1.genesyslab.com SIP/2.0
From: <sip:party1@pbx2.genesyslab.com>
To: <sip:party1@pbx1.genesyslab.com>
Call-ID: 123456789@pbx1.genesyslab.com
CSeq: 1 INFO
Content-Length: ???
Content-Type: application/xml
Via: SIP/2.0/TCP 192.168.20.53: 5085;branch= z9hG4bK5abcdef
<XML/CSTA Payload: Party "Party 2" changed to "Party 3">

2. 200 OK
SIP/2.0 200 OK
From: <sip:party1@pbx2.genesyslab.com>
To: <sip:party1@pbx1.genesyslab.com>
Call-ID: 123456789@pbx1.genesyslab.com
CSeq: 1 INFO
Content-Length: ???
Content-Type: application/xml
Via: SIP/2.0/TCP 192.168.20.53:5085;branch= z9hG4bK5abcdef <XML/CSTA Payload>

Figure 7:
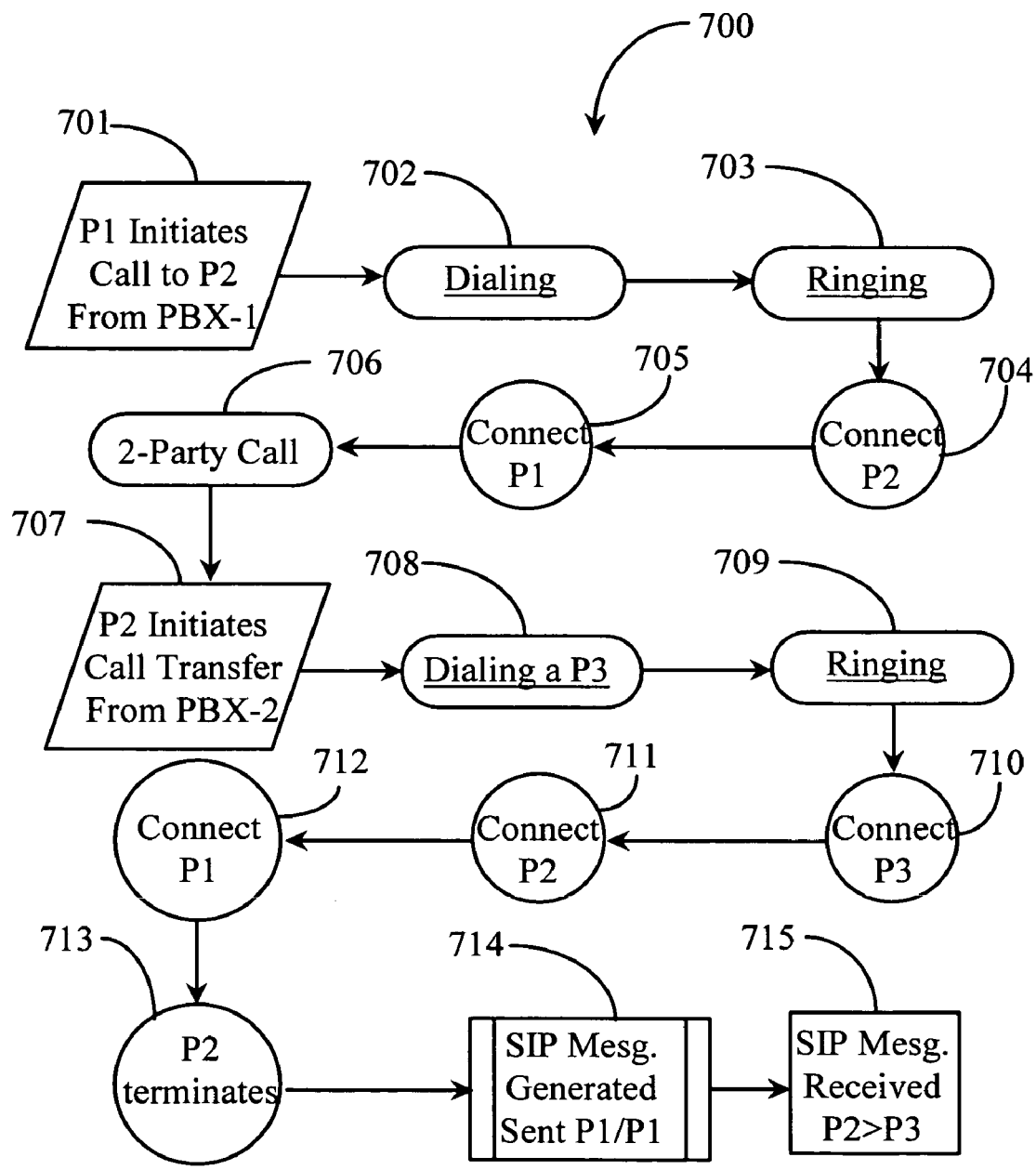
FIG. 7 is a process flow diagram illustrating steps for synchronizing a call-transfer according to an embodiment of the present invention.

FIG. 7 is a process flow diagram 700 illustrating steps for synchronizing a call-transfer according to an embodiment of the present invention. At step 701 a party P1 initiates a call to a party P2 from a first telephone switch (PBX-1). At step 702 a dialing event occurs at switch 1 and at step 703 a ringing event occurs.

At step 704 P2 picks up establishing the receiving end and at step 705 the call is connected to P1 defining an established two-party call in session at step 706. At this point there is no call-state event or identity information to synchronize because of the fact that the session in a simple two-party session serviced by no more than two switches.

At step 707, P2 initiates a call transfer event from a second switch PBX-2. This involves dialing a third party (P3) in step 708, establishing a ringing event at step 709, and having P3 pickup at step 710. At step 711 P2 is connected to P3 fully establishing the call. At step 712, P3 is connected to P1. At step 713, P2 terminates his or her connection to the session.

At step 714, an SIP message is generated from the point of PBX2 and sent to PBX1 with reference to P1 state known to PBX2. The SIP message identifies P3 as an added party and that P2 has terminated from the call. Thus a notification to P1 may appear at step 715 stating that P2 has changed to P3 (P2>P3). This exemplary process may be visualized in the embodiment of FIG. 6 above. It will be appreciated by one with skill in the art that the steps illustrated in diagram 700 may vary in description and number according to complexity and type of call events that may occur with respect to a multiparty session. Complexity may be denoted by increasing numbers of participants and PBX switches involved. However, even in the most complex sessions K-server call-event notification and state synchronization is a very efficient way for all parties to have access to identification and active states concerning all other parties in the session. Benefits not formerly existing like knowledge of validity of an event like a party terminating after a call transfer help to make multiparty sessions more secure and appropriate for higher-level discussions and the like.

In one embodiment, call-event notifications are synthesized by an intelligent voice peripheral such as an IVR connected to the call switch. In another embodiment they may arrive via other connection such as an IP connection to a data terminal having a graphics user interface (GUI). In still another embodiment using wireless digital telephony, the event and state information can be displayed on a user's wireless cell display while the user is engaging in conversation over the same link.

The methods and apparatus of the present invention may be practiced over a variety of networks and may incorporate other messaging vehicles other than SIP such as short mail messaging; instant messaging; e-mail; Voice over IP; and so on. In a preferred embodiment, SIP is chosen because of its widespread availability and use. The methods and apparatus of the present invention should be afforded the broadest scope under examination I view of the many possible embodiments cited. The spirit and scope of the present invention should be limited only by the following claims.

What is claimed is:

1. A system for synchronizing party information and call-state information between two or more telephone switches involved in establishing a multiparty communication session comprising:
    at least one server application for serving information and receiving information; and
    a translation service for translating received information between formats of telephony and those of digital messaging.

2. The system of claim 1 wherein synchronization between switches occurs over a data packet network.

3. The system of claim 2 wherein the data packet network is the Internet network and session initiation protocol is used to propagate the information between switches.

4. The system of claim 1 wherein the party information includes party name and communication access number.

5. The system of claim 4 wherein the communication access number is a telephone number.

6. The system of claim 1 wherein the translation service translates between session initiation protocol format and computer integrated telephony format.

7. The system of claim 1 wherein call-state information includes party addition, party transfer, hold, and call waiting.

8. The system of claim 1 wherein the translation service translates between session initiation protocol format and transaction server format.

9. The system of claim 1 wherein the communication session is a multiparty telephone call.

10. The system of claim 1 further comprising a notification mechanism for notifying parties of identification information and call-state of other parties to the multiparty communication.

11. The system of claim 10 wherein the notification mechanism is a session initiation protocol server.

12. The system of claim 10 wherein the notification mechanism is an instant message server.

13. The system of claim 10 wherein the notification mechanism is an email server.

14. A method for synchronizing call-state information between two or more telephone switches involved in a multiparty communication session over a communications network including steps of:
(a) connecting each involved switch to a digital network;
(b) establishing a call connection using the two or more switches between a first party and a second party;
(c) establishing minimally one additional party by second call connection to define a multiparty session;
(d) from the digital network side of each switch, monitoring the party information and call-state events of each party connected to each switch involved in the communications session;
(e) causing propagation over the digital network from certain ones of the switches to other switches involved in the session, party-identity and call-state information as the information becomes available to the certain ones of the switches; and
(f) causing notification to be sent to certain parties connected to the switches receiving the party identification and call-state information, the notifications containing the party identifiers and current call-states of the other parties.

15. The method of claim 14 wherein in step (a) the digital network is the Internet network.

16. The method of claim 14 wherein in step (a) the switches are private branch exchange switches and the communications network is a public switched telephone network.

17. The method of claim 14 wherein in step (a) connecting involves physical network connection and software for communication between switches.

18. The method of claim 14 wherein in step (b) the call connection established is a telephone call.

19. The method of claim 14 wherein in step (d) the party identification and call state events for a session are monitored through a computer integrated telephony link by a transaction server software.

20. The method of claim 14 wherein in step (e), the method of propagation is a messaging network supported over the digital network.

21. The method of claim 20 wherein in step (e) the messaging protocol is session initiation protocol.

22. The method of claim 20 wherein in step (e) the messaging protocol is instant message protocol.

23. The method of claim 14 wherein in step (f) the method of notification is interactive voice response notification.

24. The method of claim 14 wherein in step (f) the method of notification is computerized display text messaging.

25. A server application for serving and receiving party identification and call-states of parties from a telephone switch participating in a multiparty communications session comprising:
a portion for receiving real time data from a telephone switch;
a portion for translating the data into a messaging format; and
a portion for generating and sending a formatted message containing the data to certain other like applications associated with certain other switches.

* * * * *